US012748681B2

(12) United States Patent
Mantri et al.

(10) Patent No.: US 12,748,681 B2
(45) Date of Patent: Sep. 29, 2026

(54) INTELLIGENT CONCURRENT TESTING FOR TEST CYCLE TIME REDUCTION

(71) Applicant: Harness Inc., San Francisco, CA (US)

(72) Inventors: Hemanth Mantri, San Francisco, CA (US); Rutvij Mehta, San Francisco, CA (US); Dinesh Garg, Hayward, CA (US)

(73) Assignee: HARNESS INC., San Francisco, CA (US)

( * ) Notice: Subject to any disclaimer, the term of this patent is extended or adjusted under 35 U.S.C. 154(b) by 32 days.

(21) Appl. No.: 18/123,888

(22) Filed: Mar. 20, 2023

(65) Prior Publication Data

US 2024/0320135 A1 Sep. 26, 2024

(51) Int. Cl.
*G06F 11/3668* (2025.01)
*G06F 11/3698* (2025.01)

(52) U.S. Cl.
CPC ...... *G06F 11/3688* (2013.01); *G06F 11/3698* (2025.01)

(58) Field of Classification Search
CPC ......................... G06F 11/3664; G06F 11/3688
USPC .................................................. 717/124–135
See application file for complete search history.

(56) References Cited

U.S. PATENT DOCUMENTS

| | | | | |
|---|---|---|---|---|
| 11,841,790 | B2 * | 12/2023 | Mitchell | G06F 11/3668 |
| 2009/0265693 | A1 * | 10/2009 | Bakowski | G06F 11/3688 717/131 |
| 2019/0129832 | A1 * | 5/2019 | Budnik | G06F 40/205 |
| 2023/0010781 | A1 * | 1/2023 | Ningappa | G06F 11/3664 |

OTHER PUBLICATIONS

Chris Harbert, "Parallel Test Execution Guide", 2021, https://blog.testery.io/parallel-test-execution-guide/ , 9 pages. (Year: 2021).*
playwright.dev, "Annotations", 2022, retrieved from https://playwright.dev/docs/test-annotations , 4 pages. (Year: 2022).*

* cited by examiner

*Primary Examiner* — Ted T. Vo
(74) *Attorney, Agent, or Firm* — Jason A. Smith; Shumaker, Loop & Kendrick, LLP

(57) ABSTRACT

A system that automatically reduces the time to execute software testing through intelligent test selection and execution. The system automatically detects what tests to execute based on code that has been changed, which is a subset of the entire list of tests to run for the block of code. Once the subset of tests is identified, annotations for tests are processed to update the subset as desired by the code administrator. Once updated, the system then automatically obtains the tests for the updated subset of tests. The tests to be executed are then distributed into groups or buckets. The distribution is set so that each group of tests will have as close to the same execution time as possible. The tests in each group or bucket are then executed concurrently with the other grouped tests.

20 Claims, 11 Drawing Sheets

| METHOD | TEST |
|---|---|
| M1 | T1, T2 |
| M2 | T3 |
| M3 | T4 |
| M4 | T5, T6, T7 |
| M5 | T8, T9 |
| M6 | T10 |
| M7 | T10, T11 |
| M8 | T12 |
| M9 | T13, T14 |
| M10 | T15 |
| M11 | T16, T17 |
| M12 | T18 |
| M13 | T19, T20 |
| M14 | T21, T22 |
| M15 | T23 |
| M16 | T24, T25 |
| M17 | T26 |
| M18 | T27 |

FIGURE 8A

| METHOD | TEST | Annot |
|---|---|---|
| M1 | T1, T2 | include |
| M2 | T3 | |
| M3 | T4 | |
| M4 | T5, T6, T7 | |
| | | |
| | | |
| | | |
| | | |
| | | |
| | | |
| M11 | T16, T17 | |
| M12 | T18 | skip |
| M13 | T19, T20 | |
| | | |
| | | |
| | | |
| M17 | T26 | |
| M18 | T27 | |

FIGURE 8B

| METHOD | TEST | time |
|---|---|---|
| M1 | T1, T2 | 85 |
| M2 | T3 | 23 |
| M3 | T4 | 33 |
| M4 | T5, T6, T7 | 45 |
| | | |
| | | |
| | | |
| | | |
| | | |
| | | |
| M11 | T16, T17 | 21 |
| | | |
| M13 | T19, T20 | 19 |
| | | |
| | | |
| | | |
| M17 | T26 | 7 |
| M18 | T27 | 19 |

FIGURE 8C

| METHOD | TEST | time | Bucket |
|---|---|---|---|
| M1 | T1, T2 | 85 | 1 |
| M4 | T5, T6, T7 | 45 | 2 |
| M3 | T4 | 33 | 2 |
| M2 | T3 | 23 | 1 |
| M11 | T16, T17 | 21 | 1 |
| M13 | T19, T20 | 19 | 2 |
| M18 | T27 | 19 | 2 |
| M17 | T26 | 15 | 1 |
| M17 | T26 | 7 | 1 |

FIGURE 9A

| bucket | duration | average | Over/under |
|---|---|---|---|
| 1 | 151 | 133.5 | 17.5 |
| 2 | 116 | 133.5 | -17.5 |

FIGURE 9B

| METHOD | TEST | time | Bucket |
|---|---|---|---|
| M1 | T1, T2 | 85 | 1 |
| M4 | T5, T6, T7 | 45 | 2 |
| M3 | T4 | 33 | 2 |
| M2 | T3 | 23 | 1 |
| M11 | T16, T17 | 21 | 1 |
| M13 | T19, T20 | 19 | 2 |
| M18 | T27 | 19 | 2 |
| M17 | T26 | 15 | 2 |
| M17 | T26 | 7 | 1 |

FIGURE 10A

| bucket | duration | average | Over/under |
|---|---|---|---|
| 1 | 136 | 133.5 | 2.5 |
| 2 | 131 | 133.5 | -2.5 |

FIGURE 10B

INTELLIGENT CONCURRENT TESTING FOR TEST CYCLE TIME REDUCTION

BACKGROUND

Continuous integration of software involves integrating working copies of software into mainline software, in some cases several times a day. Before integrating the working copy of software, the working copy must be tested to ensure it operates as intended. Testing working copies of software can be time consuming, especially when following typical testing protocols which require executing an entire test plan every test cycle. An entire test plan often takes hours to complete, which wastes computing resources and developer time. What is needed is an improved method for testing working copies of software.

SUMMARY

The present technology, roughly described, automatically reduces the time to execute software testing through intelligent test selection and execution. The present system automatically detects what tests to execute based on code that has been changed, which is a subset of the entire list of tests to run for the block of code. Once the subset of tests is identified, annotations for tests are processed to update the subset as desired by the code administrator. Once updated, the system then automatically obtains the tests for the updated subset of tests. The tests to be executed are then distributed into groups or buckets. The distribution is set so that each group of tests will have as close to the same execution time as possible. The tests in each group or bucket are then executed concurrently with the other grouped tests. By running tests within the buckets concurrently, and with the total test execution duration as close to the same time as possible, the total testing duration is reduced to make the test execution as efficient as possible.

In some instances, the present technology provides a method for automatically testing software code concurrently. The method begins by detecting a test event initiated by a testing program and associated with testing a first software at a testing server. The test event is detected by an agent executing within the testing program at the testing server, and the testing event is associated with a plurality of tests for the first software. The method continues by receiving, by the agent on the testing server from the remote server, a list of tests to be performed in response to the test event. The received list of tests is a subset of the plurality of tests. The method then divides the subset of tests into two or more groups. Next, the method executes each of the two or more groups of tests concurrently.

In some instances, a non-transitory computer readable storage medium includes embodied thereon a program, the program being executable by a processor to automatically testing software code concurrently. The method begins by detecting a test event initiated by a testing program and associated with testing a first software at a testing server. The test event is detected by an agent executing within the testing program at the testing server, and the testing event is associated with a plurality of tests for the first software. The method continues by receiving, by the agent on the testing server from the remote server, a list of tests to be performed in response to the test event. The received list of tests is a subset of the plurality of tests. The method then divides the subset of tests into two or more groups. Next, the method executes each of the two or more groups of tests concurrently.

In some instances, a system for automatically testing software code concurrently includes a server having a memory and a processor. One or more modules can be stored in the memory and executed by the processor to detect a test event initiated by a testing program and associated with testing a first software at a testing server, the test event detected by an agent executing within the testing program at the testing server, the testing event associated with a plurality of tests for the first software, receive, by the agent on the testing server from the remote server, a list of tests to be performed in response to the test event, the received list of tests being a subset of the plurality of tests, divide the subset of tests into two or more groups, and execute each of the two or more groups of tests concurrently.

BRIEF DESCRIPTION OF FIGURES

FIGS. 8A-C illustrate tables of tests to be performed.

FIGS. 9A-B illustrate tables of test data and bucket data.

FIGS. 10A-B illustrate tables of updated test data and bucket data.

DETAILED DESCRIPTION

The present technology, roughly described, automatically reduces the time to execute software testing through intelligent test selection and execution. The present system automatically detects what tests to execute based on code that has been changed, which is a subset of the entire list of tests to run for the block of code. Once the subset of tests is identified, annotations for tests are processed to update the subset as desired by the code administrator. Once updated, the system then automatically obtains the tests for the updated subset of tests. The tests to be executed are then distributed into groups or buckets. The distribution is set so that each group of tests will have as close to the same execution time as possible. The tests in each group or bucket are then executed concurrently with the other grouped tests. By running tests within the buckets concurrently, and with the total test execution duration as close to the same time as possible, the total testing duration is reduced to make the test execution as efficient as possible. As a result, the test time reduction directly translates to dollars saved due to lower infrastructure usage as well as improved developer productivity.

The present system addresses a technical problem of efficiently testing portions of software to be integrated into a main software system used by customers. Currently, when a portion of software is to be integrated into a main software system, a test plan is executed to test the entire test portion. The entire test plan includes many tests and takes a long time to complete, often hours, and takes up large amounts of processing and memory resources, as well as time.

The present system provides a technical solution to the technical problem of efficiently testing software by intelligently selecting a subset of tests from a test plan and executing the subset. The present system identifies portions of a system that have changed or for which a test has been changed or added, and adds the identified tests to a test list. An agent within the test environment then executes the identified tests. The portions of the system can be method classes, allowing for a very precise list of tests identified for execution. The testing is performed more efficient by dividing the testing code into groups or buckets and executing the test groups concurrently.

Figure 1:
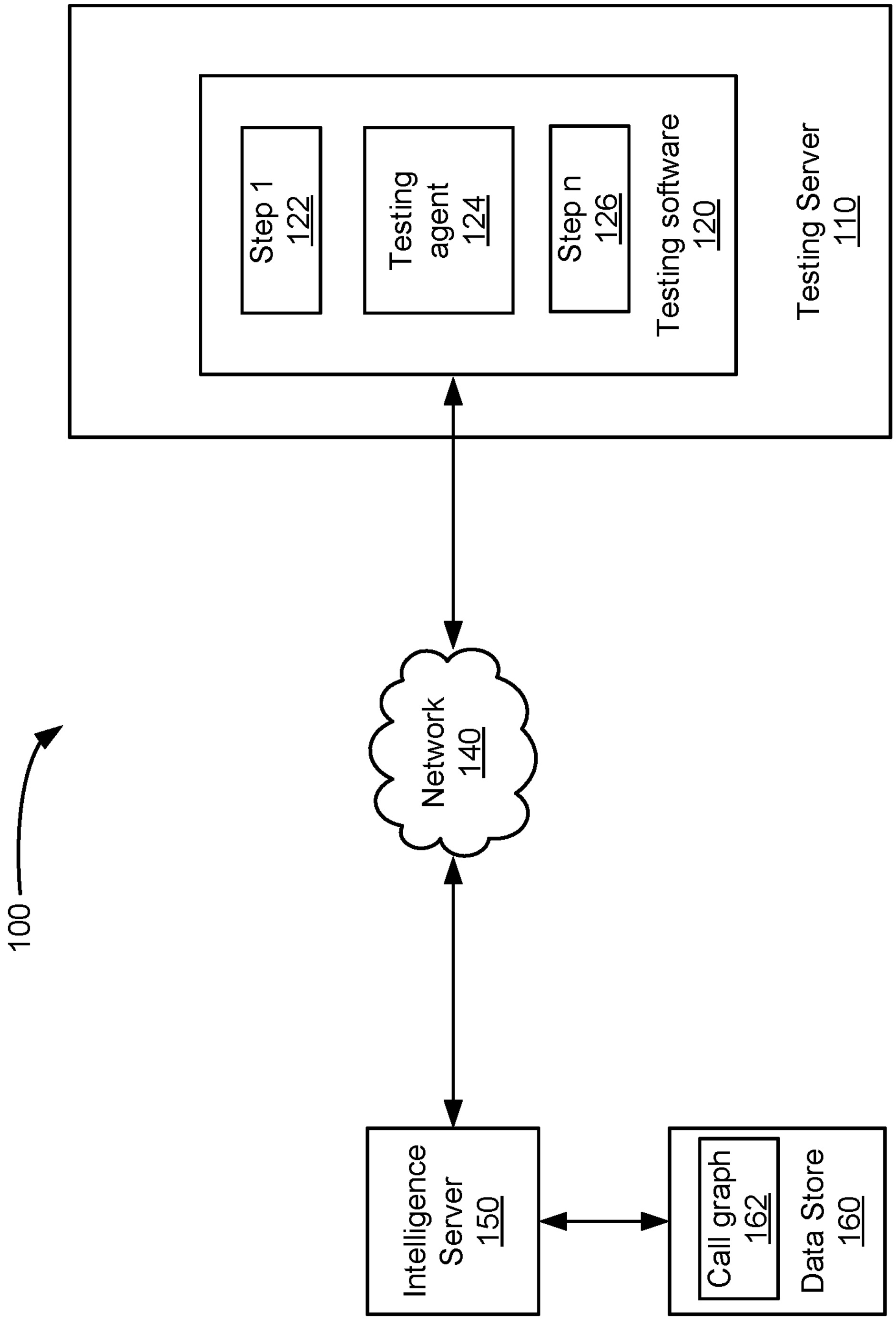
FIG. 1 is a block diagram of a system for testing software.

FIG. 1 is a block diagram of a system for testing software. System 100 of FIG. 1 testing server 110, network 140, intelligence server 150, data store 160, and artificial intelligence (AI) platform 170. Testing server 110, intelligence server 150, data store 160, may all communicate directly or indirectly with each other over network 140.

Network 140 may be implemented by one or more networks suitable for communication between electronic devices, including but not limited to a local area network, wide-area networks, private networks, public network, wired network, a wireless network, a Wi-Fi network, an intranet, the Internet, a cellular network, a plain old telephone service, and any combination of these networks.

Testing server 110 may include testing software 120. Testing software 120 tests software that is under development. The testing software can test the software under development in steps. For example, the testing software may test a first portion of the software using a first step 122, and so on with additional steps through an nth step 126.

A testing agent 124 may execute within or in communication with the testing software 120. The testing agent may control testing for a particular stage or type of testing for the software being developed. In some instances, the testing agent may detect the start of the particular testing, and initiate a process to identify which tests of a test plan to execute in place of every test in the test plan. Testing agent 124 is discussed in more detail with respect to FIG. 2.

Intelligence server 150 may communicate with testing server 110 and data store 160, and may access a call graph stored in data store 160. Intelligence server 150 may identify a subgroup of tests for testing agent 124 to execute, providing for a more efficient testing experience at testing server 110. Intelligence server 150 may, in some instances, apply annotations to a test subset, distribute tests into groups or buckets, move tests between groups or buckets, automatically obtain testing code, and perform other functionality as described herein. Intelligence server 150 is discussed in more detail with respect to FIG. 3.

Data store 160 may store a call graph 162 and may process queries for the call graph. The queries main include storing a call graph, retrieving call graph, updating portions of a call graph, retrieving data within the call graph, and other queries.

The present application describes a system for testing software. Some additional details for modules described herein are described in U.S. patent application Ser. No. 17/371,127, filed on Jul. 21, 2021, titled "Test Cycle Time Reduction and Optimization," and U.S. patent application Ser. No. 17/545,577, filed on Dec. 8, 2021, titled "Reducing Time to First Failure," the disclosures of which are incorporated herein by reference.

Figure 2:
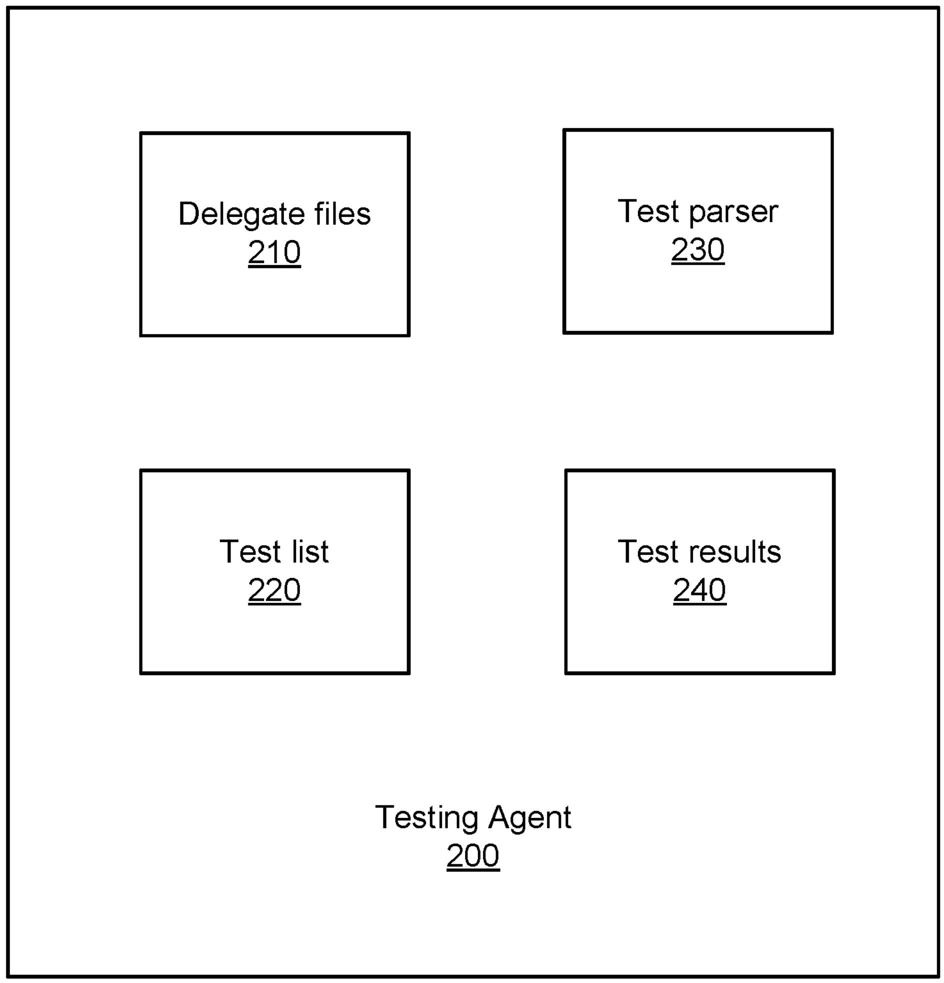
FIG. 2 is a block diagram of a testing agent.

FIG. 2 is a block diagram of a testing agent. Testing agent 200 of FIG. 2 provides more detail of testing agent 120 of FIG. 1. Testing agent 200 includes delegate files 210, test list 220, test parser 230, and test results 240. Delegate files include files indicating what parts of a software under test have been updated or modified. These files can eventually be used to generate a subgroup of tests to perform on the software. Test list 220 is a list of tests to perform on the software being tested. The test list 220 may be retrieved from intelligence server 150 in response to providing the delegate files to the intelligence server. A test parser 230 parses files that have been tested to identify the methods and other data for each file. Test results 240 provide the results of a particular tests to indicate the test status, results, and other information.

Figure 3:
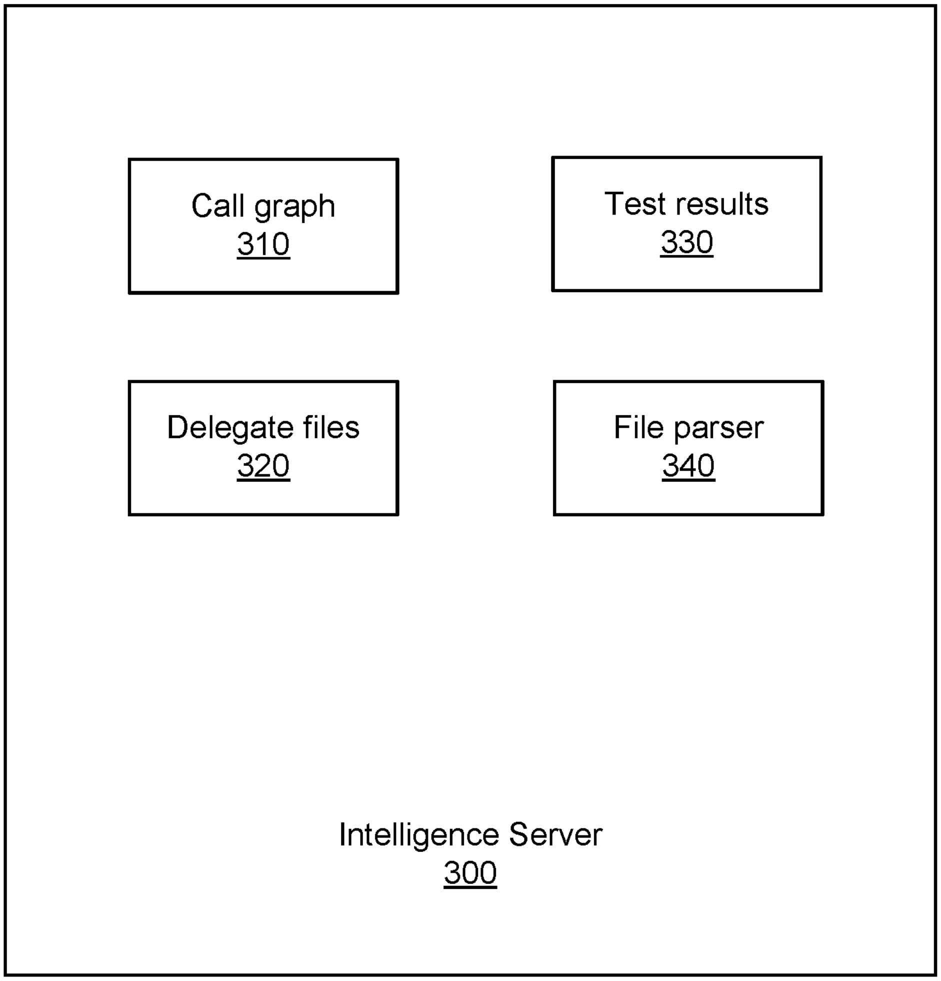
FIG. 3 is a block diagram of an intelligence server.

FIG. 3 is a block diagram of an intelligence server. Intelligence server 300 of FIG. 3 provides more detail for intelligence server 150 of the system of FIG. 1. Intelligence server 300 includes call graph 310, delegate files 320, test results 330, and file parser 340. Call graph 310 is a graph having relationships between methods of the software under development, and subject to testing, and the tests to perform for each method. A call graph can be retrieved from the data store by the intelligence server. Delegate files are files are files within information regarding methods of interest in the software to be tested. Methods of interest include methods which have been changed, methods that have been added, and other methods. files can be received from the testing agent from the testing server. Test results 330 indicate the results of a particular set of tests. The test results can be received from a remote testing agent that is perform the tests. File parser 340 parses one or more delicate files received from a remote testing agent in order to determine which methods need to be tested.

Intelligence server 300 may include more or fewer modules than described with respect to FIG. 3, and may include modules or logic not illustrated in FIG. 3 for performing functionality described herein.

Figure 4:
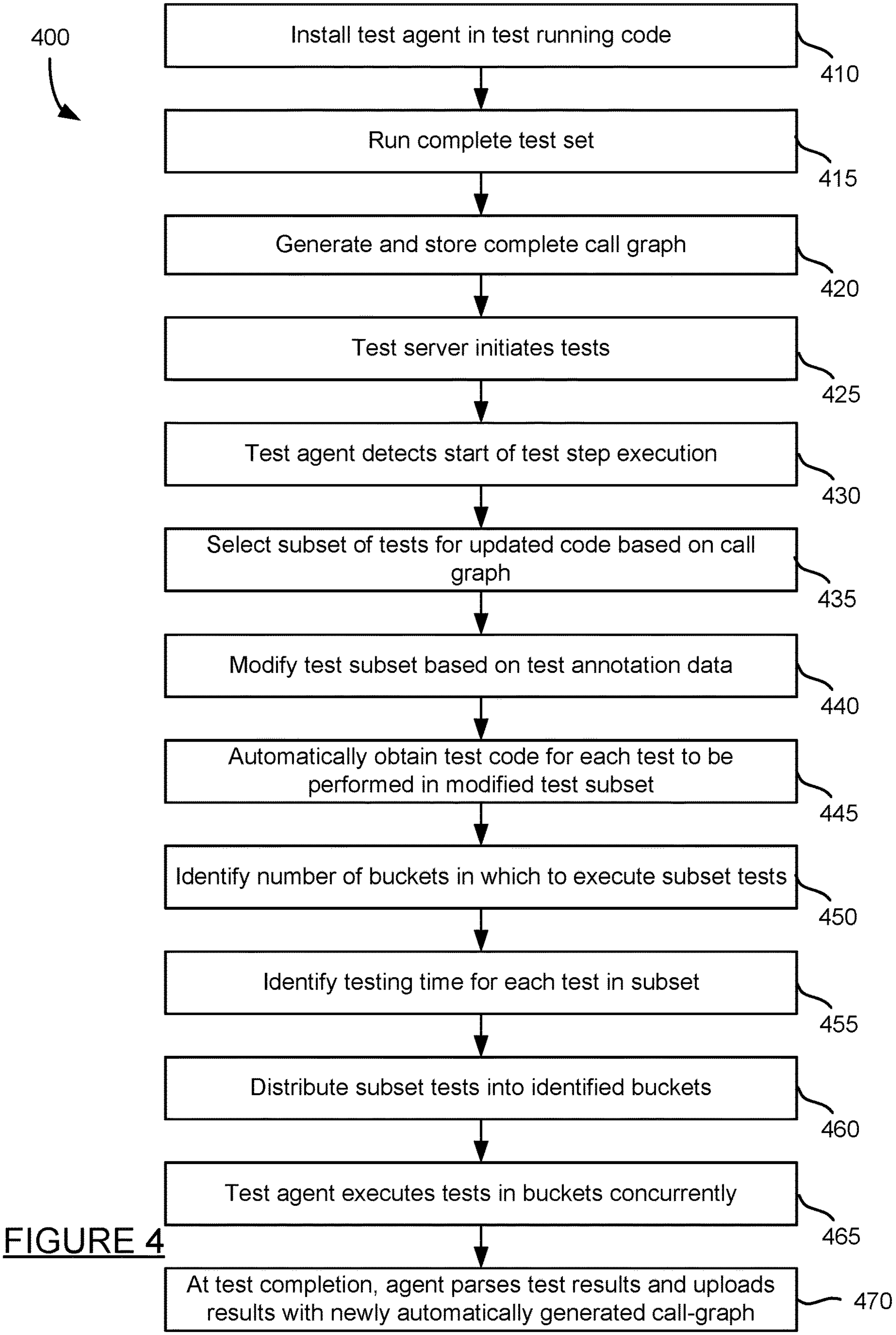
FIG. 4 is a method for testing software.

FIG. 4 is a method for testing software. First, a test agent is installed in testing software at step 410. The test agent may be installed in a portion of the testing software that performs a particular test, such as unit testing, in the software under development.

In some instances, the code to be tested is updated, or some other event occurs and is detected which triggers a test. A complete set of tests for the code may be executed at step 415. In some instances, a complete set of tests is run over time as updates to the set of tests eventually include every test, rather than executing every test at once at step 415. In some instances, all tests are not executed at step 415.

A call graph may be generated with relationships between methods and tests, and stored at step 420. Generating a call graph may include detecting properties for the methods in the code. Detecting the properties may include retrieving method class information by an intelligence server based on files associated with the updated code. The call graph may be generated by the intelligence server and stored with the method class information by the intelligence server. The call graph may be stored on the intelligence server, a data store, or both.

In some instances, generating the call graph begins when the code to be tested is accessed by an agent on the testing server. Method class information is retrieved by the agent. The method class information may be retrieved in the form of one or more files associated with changes made to the software under test. The method class information, for example the files for the changes made to the code, are then transmitted by the agent to an intelligence server. The method class information is received by an intelligence server from the testing agent. The method class information is then stored either locally or at a data store by the intelligence server.

A test server initiates tests at step 425. The agent may detect the start of a particular step in the test at step 430. A subset of tests is then selected for the updated code based on the call graph generated by the intelligence server at step 435. Selecting a subset of tests may include accessing files associated by the changed code, parsing the received files to identify method classes associated with those files, and generating a test list from the received method classes using a call graph. Selecting a subset of tests for an updated code based on the call graph is disclosed in U.S. patent application Ser. No. 17/371,127, filed Jul. 9, 2021, titled "Test Cycle time Reduction and Optimization," the disclosure of which is incorporated herein by reference.

The test subset may be modified based on test annotation data at step 440. The test subset may be modified by adding tests or removing tests, based on the annotation data associated with one or more tests. The annotation data may be added to one or more tests in a variety of ways. In some instances, an administrator may add annotation data to one or more tests. The administrator may add annotation data (e.g., meta data, a label, or some other data) to indicate how a particular test should be handled. In some instances, a testing system may use logic to add annotation data to a particular test. More detail for modifying a test subset based on annotation data is discussed with respect to the method of FIG. 5.

Test code is automatically obtained for each test to be performed in the modified test subset at step 445. The actual test code can be obtained in different ways, based on the system being tested and the platform. For example, in Java, the tests a particular changed portion of code may be in a test domain that can be accessed based on the name of the code that was modified. In some instances, the testing code can be obtained based on a blob specified by a code administrator.

A number of buckets are identified, by the present system, in which to execute subset tests at step 450. In some instances, the number of buckets may be set based one or more factors, including but not limited to a customer plan (paid, premium, not paid), number of resources available, number of tests to be executed in the subset, the capacity of each bucket, and so forth.

The present description uses the terms bucket and group to describe where tests are distributed. In some instances, the tests are grouped into buckets. However, the terms are intended to be interchangeable, and a bucket and group are not intended to be exclusive of each other.

The test duration for each test within a bucket is identified at step 455. For tests that have been executed previously, the test duration is determined as the average time of the previous test executions for that particular test. For tests that have not been executed previously, the test duration is determined based on the number of lines of code for that particular test. To determine the time to allocate for each line of code, the average execution time per line of code for other portions of code could be determined, and then applied to the lines of code for the test that has not been executed. The time per line of code could also be assigned by an administrator.

Subset tests are distributed into the identified buckets at step 460. The tests may be distributed such that each bucket has a total test execution time as close as possible to the average test execution time for all the buckets. This allows for the maximum time savings benefit during test execution, as no bucket should take much longer to execute than any other bucket. Distributing the subset tests into the identified buckets to maximize time savings is discussed in more detail below with respect to the method of FIG. 6.

Once the subset of tests are within their respective buckets, a test agent may execute the tests in each bucket concurrently at step 465. For each bucket, the tests are run consecutively, and the first test in each bucket can be started simultaneously. In some instances, a test agent executes the test list with instrumentation on. This allows data to be collected during the tests. As the tests execute, data regarding each test is stored. The stored data includes whether the test passes or fails, the total execution time, whether the entire test executed, and other data.

Once the test execution is complete, an agent parses the test results and uploads the results with a newly automatically generated call-graph at step 470. The new call-graph is generated based on the results of the newly executed subset of tests.

At test completion, the testing agent accesses and parses the test results and uploads the results with an automatically generated call graph at step 455. Parsing the test results may include looking for new methods as well as results of previous tests. The results may be uploaded to the intelligence server and include all or a new portion of a call graph or new information from which the intelligence server may generate a call graph. The intelligence server may then take the automatically generated call graph portion and place it within the appropriate position within a master call graph. The call graph is then updated, whether it is stored locally at the intelligence server or remotely on the data store.

Figure 5:
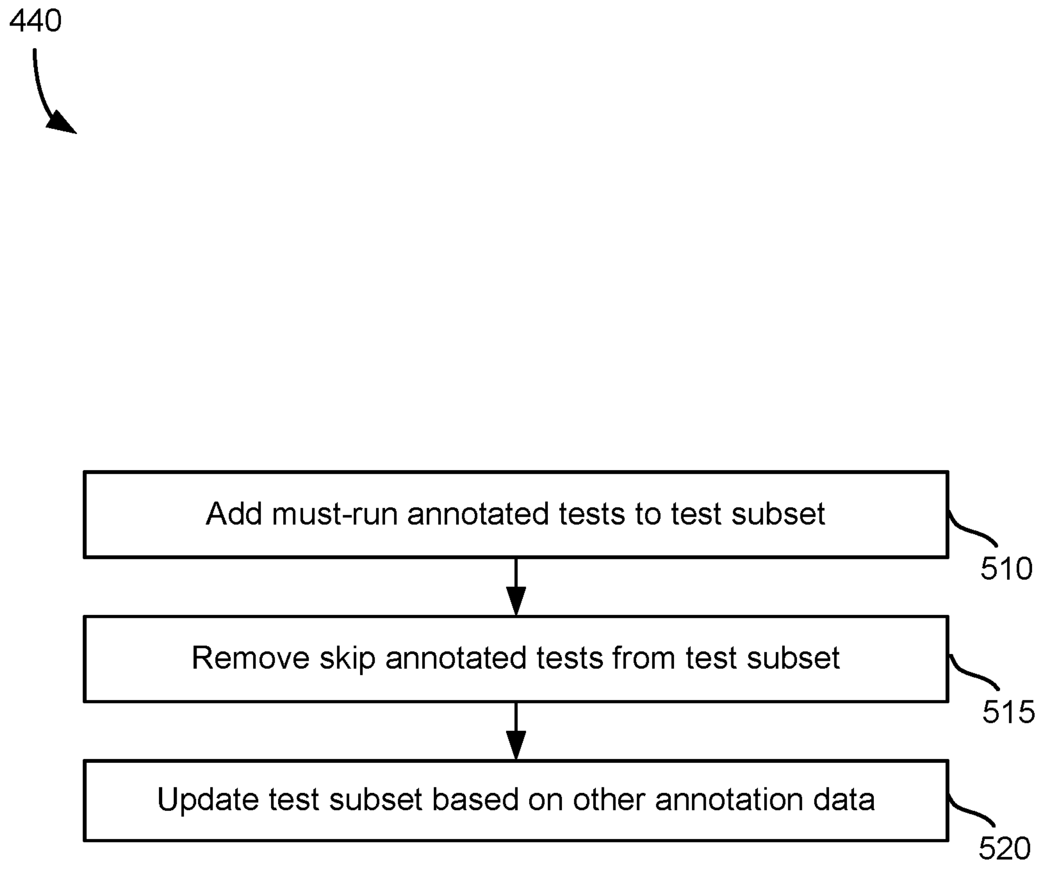
FIG. 5 is a method for modifying a test subset based on test annotation data.

FIG. 5 is a method for modifying a test subset based on test annotation data. The method of FIG. 5 provides more detail for step 440 of the method of FIG. 4. First, tests within the subset that are annotated as "must-run" are added at step 510. The must run tests are tests that should be included whether or not they have been selected to being part of the subset or not. Hence, in some instances, a must-run test is added to a subset of tests.

Test annotated with "Skip" are removed from the test subset at step 515. These tests should not be in the subset regardless of whether or not they were selected to be included within the subset of tests. The subset can further be updated based on other annotation data at step 520. For example, a particular test may be included based on conditions, such as whether one or more other tests are included or are not included. Some tests may be included based on the time, day, or total duration of the current subset of tests. Some tests may be included based on the platform for which the tests are being run.

Figure 6:
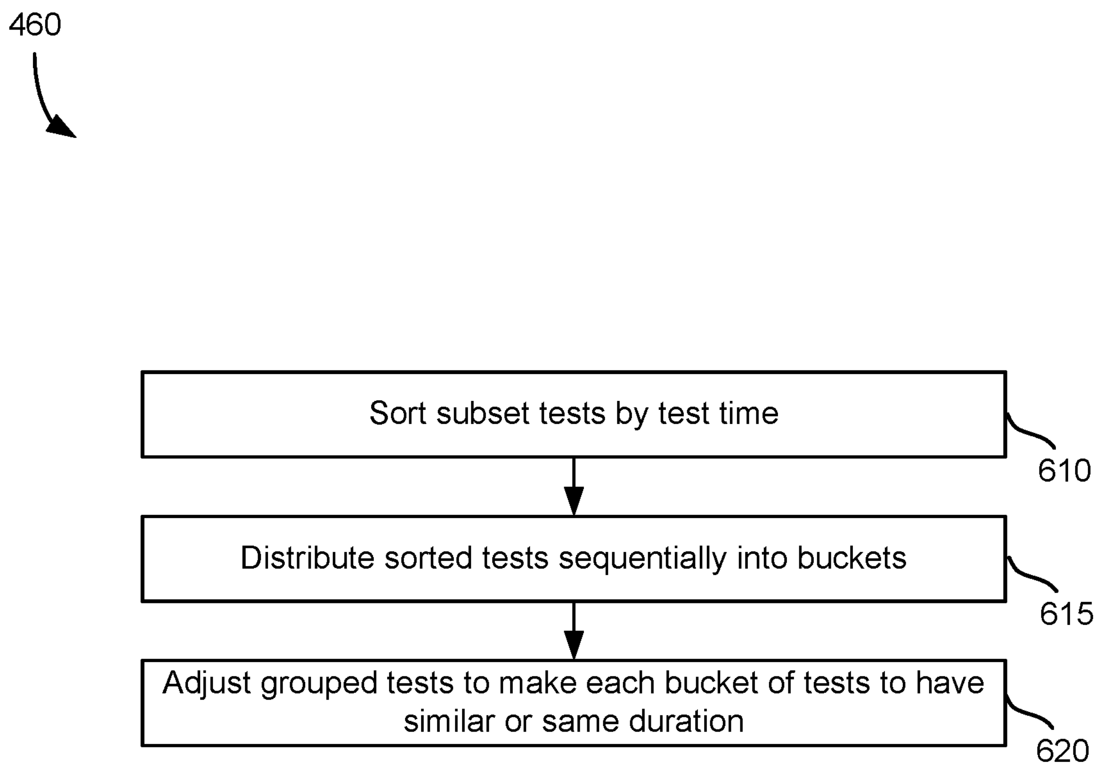
FIG. 6 is a method for distributing subset tests into identified buckets.

FIG. 6 is a method for distributing subset tests into identified buckets. The method of FIG. 6 provides more detail for step 455 of the method of FIG. 4. First, a subset of tests is sorted by test time at step 610. For example, the test within the subset may be sorted from longest duration to shortest duration. Next, the sorted test may be distributed sequentially into buckets at step 615. For example, if there were three buckets, the longest duration test may be placed into one bucket, the second longest duration test may be placed into another bucket the third longest duration test may be placed in the third bucket, the fourth longest duration test may be placed in the third bucket, the fifth longest duration test may be placed in the fourth bucket, the sixth longest may be placed in the first bucket, and so forth in a snake like pattern.

Once the tests have been placed into buckets, the group tests may be adjusted to make each bucket of tests have a total test execution duration as close to the overall average bucket test execution duration as possible at step 620. Adjusting the group of tests within each bucket may include moving one or more tests from one bucket to another.

Adjusting group tests within the buckets is discussed in more detail below with respect to the method of FIG. 7.

Figure 7:
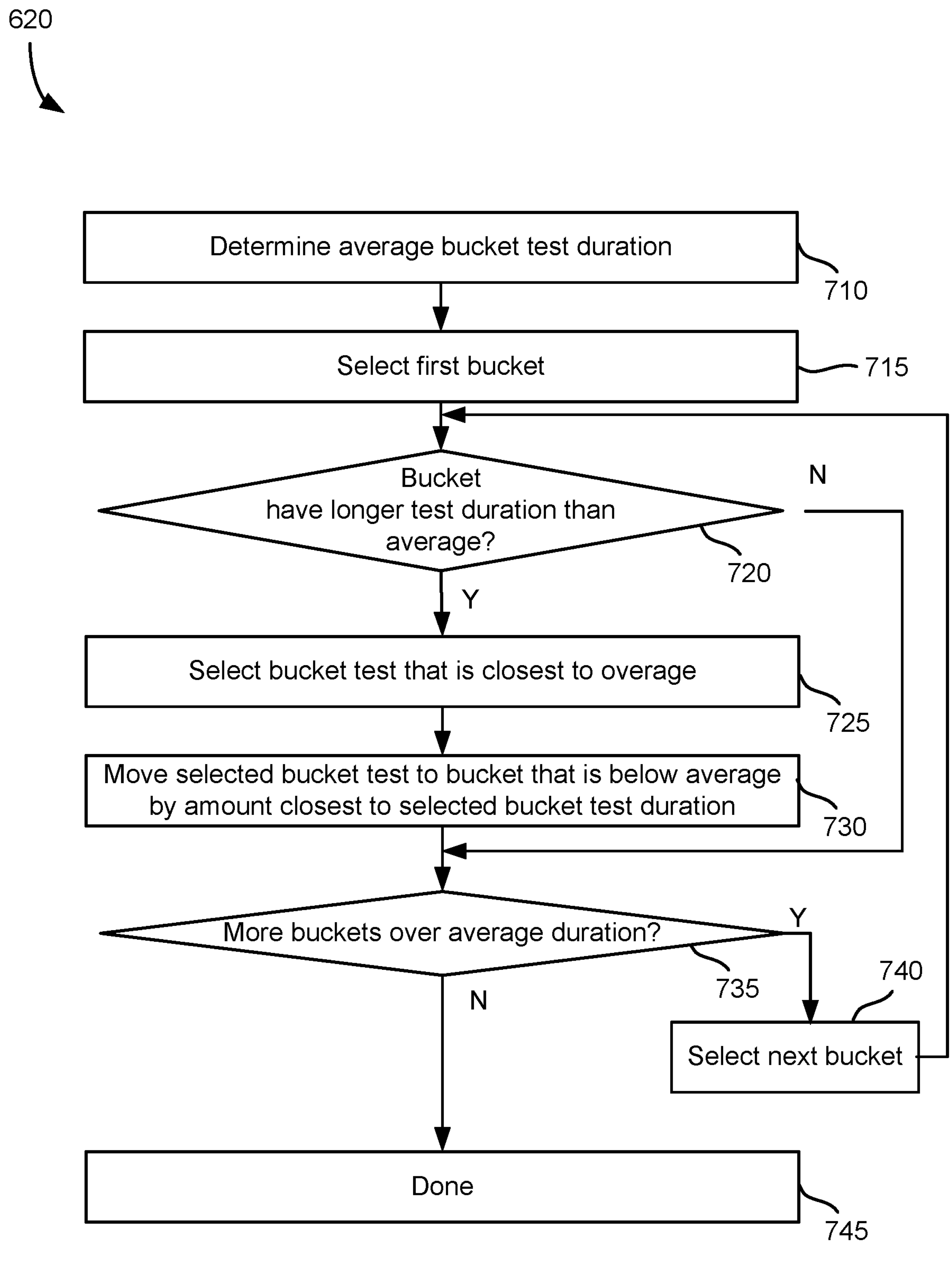
FIG. 7 is a method for adjusting grouped tests to make each bucket of tests to have similar or the same duration.

FIG. 7 is a method for adjusting grouped tests to make each bucket of tests to have similar or the same duration. The method of FIG. 7 provides more detail for step 620 of the method of FIG. 6. First, the average bucket test duration is determined at step 410. The total execution time for each bucket is determined, and then divided by the number of buckets.

Next, a first bucket is selected at step 415. A determination is then made as to whether the selected bucket has an execution time longer than the average bucket execution time at step 420. If the selected bucket does not have a longer execution duration than the average bucket execution duration determined at step 410, the method of FIG. 6 continues to step 435. If the selected bucket does have a longer test duration than the average duration time, a bucket test within the selected bucket having a duration closest to the overage is selected at step 425. For example, if the selected bucket had a duration of 100 seconds, and the average bucket duration is 70 seconds, a test within the selected bucket having a duration closest to 30 seconds would be selected at step 425.

The selected bucket test is moved to a bucket that is below the average by an amount closest of the selected bucket test duration at step 430. Continuing the example, if a test is selected at step 425 that is 30 seconds long, it would be placed in another bucket having a duration underage, below the average duration, that is closest to 30 seconds. The method then continues to step 435.

A determination is made as to whether more buckets have an execution duration over average execution duration at step 435. If there are additional buckets having an execution duration over the average execution duration, the next bucket is selected at step 440 and the method continues to step 420.

If there are no additional buckets having an execution duration greater than the average duration, the method ends at step 745.

FIGS. 8A-C illustrate tables of tests to be performed. FIG. 8A is a table of a full set of methods and corresponding tests. The table of FIG. 8A 7 lists methods M1 through M 18. Each method may be included in a particular unit or block of software to be tested. For each method, one or more test is listed that should be performed for that particular method. For example, method M1 is associated with tests T1 and T2, method M2 is associated with test T3, and method M3 is associated with test T4. In typical systems, when there is a change detected in the software unit or block of software, the default test plan would include all the tests for methods M1-M18.

FIG. 8B is a table of a subset of methods and their corresponding tests. The subset of methods in table 800 corresponds to methods that have been detected to have changed or are associated with new or modified tests. The subset of methods illustrated in table 900 includes M2, M3, M4, M 11, M 12, M 13, M 17, and M 18. To identify the subset of methods, a list of methods that has been updated is transferred from the test agent to the intelligence server. The test agent may obtain one for more files associated with of updated method classes and transmit the files to the intelligence server. The agent may identify the files using a change tracking mechanism, which may be part of the agent or a separate software tool. The files are received by the intelligence server, and the intelligence server generates a list of methods from the files. In some instances, the list of methods includes methods listed in the files. The method list is then provided to the data store in which the call graph is stored. The data store then performs a search for tests that are related to the methods, based on the relationships listed in the call graphs. The list of tests is then returned to the intelligence server. The result is a subset of tests, which comprise fewer than all of the tests in a test plan that would otherwise be performed in response to a change in the software under test.

The third column in the table of FIG. 8B lists annotations. As shown, tests T1 and T2 associated with method M1 are annotated with "include," meaning that these tests should be included whether they are selected based on code changes or not. Test T18 associated with method M12 is annotated as "skip," meaning that test T18 should not be included in the selected subset of tests. The updated list of tests within the subset of tests to perform is illustrated in the first two columns of the table of FIG. 8C.

The table of FIG. 8C also illustrates the execution times associated with each test or tests associated with a selected method. For example, test T3 has an execution duration of 23 seconds while test T4 has an execution time of 33 seconds.

FIGS. 9A-B illustrate tables of test data and bucket data. FIG. 9A lists the subset of tests, corresponding methods, and test execution times, all sorted by the duration of test execution times. As shown, tests T1-T2 have a duration of 85 seconds and are listed first as the longest duration while test T26 with a duration of 7 seconds is listed last.

FIG. 9B also includes an indication of which bucket each test is assigned to. In the instance illustrated in FIG. 9B, the test or tests associated with each method are assigned to one of two buckets in a snaking manner (the number of buckets is selected for discussion purposes only). For example, for tests T1 and T2 associated with method 1, the tests are assigned to bucket 1, the next tests T5, T6, and T7 associated with method 4 are assigned to bucket 2, test T4 is assigned to bucket 2, test T3 is assigned to bucket 1, and so forth. The snaking of buckets proceeds as 1-2, 2-1, 1-2, 2-1, and so forth. For three buckets, the snaking would proceed as 1-2-3, 3-2-1, 1-2-3, 3-2-1, and so forth.

FIG. 9B illustrates bucket data of total test duration time, average duration time, and the overage and underage for each bucket. As illustrated, bucket 1 has a total test execution duration of 151 seconds and is over the average of 133.5 seconds by 17.5 seconds. Bucket 2 has a total test execution duration of 116 and is under the average execution time by 17.5 seconds.

FIGS. 10A-B illustrate tables of updated test data and bucket data. As discussed with respect to FIG. 7, if the total execution time for one or more buckets is greater than the average, than the present system can transfer one or more tests to another bucket to achieve a total test duration time that is closer to the average. FIG. 10A illustrates a table that is similar to that of FIG. 9A except that test T26 has been switched to bucket 2. The test time for T26 is 15 seconds, which is the test time that is closest to the overage of 17.5 seconds with bucket 1. By moving test T26 from bucket 1 to bucket 2, the buckets are now only 2.5 seconds over or under the average total test duration time of 133.5 seconds, per the table of FIG. 10B. As such, buckets 1 and 2 are closer in total test duration and the test execution will be more efficient when they are executed concurrently.

In some instances, the splitting/dividing of the tests into groups is based on the execution time data from the tests, and the splitting is an adaptive process. A split of the subset of tests will change over time, for example based on the previous execution data, because tests evolve with time.

Figure 11:
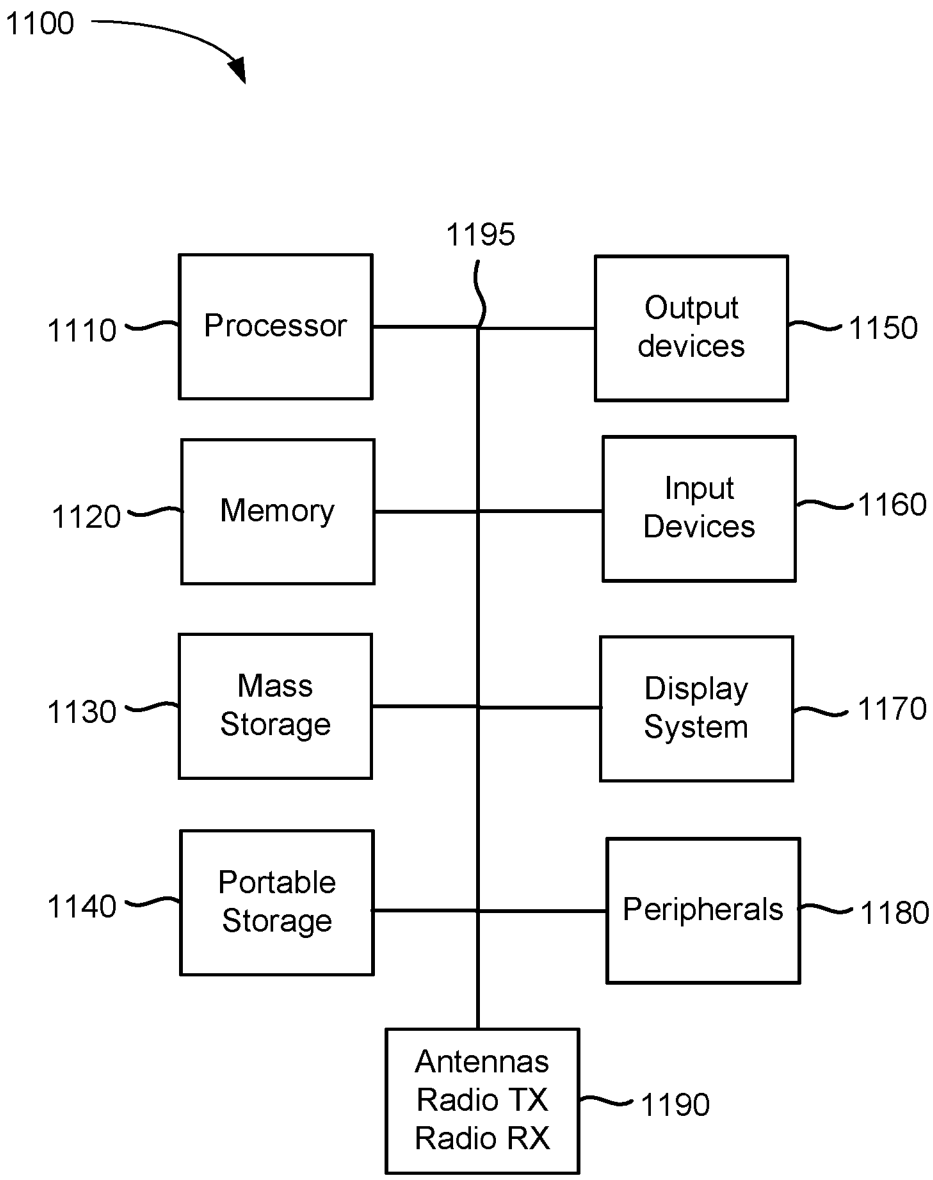
FIG. 11 is a block diagram of a computing environment for implementing the present technology.

FIG. 11 is a block diagram of a system for implementing machines that implement the present technology. System 1100 of FIG. 11 may be implemented in the contexts of the likes of machines that implement testing server 110, intelligence server 150, and data store 160. The computing system 1100 of FIG. 11 includes one or more processors 1110 and memory 1120. Main memory 1120 stores, in part, instructions and data for execution by processor 1110. Main memory 1120 can store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. However, the components may be connected through one or more data transport means. For example, processor unit 1110 and main memory 1120 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive, an optical disk drive, a flash drive, or other device, is a non-volatile storage device for storing data and instructions for use by processor unit 1110. Mass storage device 1130 can store the system software for implementing embodiments of the present invention for purposes of loading that software into main memory 1120.

Portable storage device 1140 operates in conjunction with a portable non-volatile storage medium, such as a floppy disk, compact disk or Digital video disc, USB drive, memory card or stick, or other portable or removable memory, to input and output data and code to and from the computer system 1100 of FIG. 11. The system software for implementing embodiments of the present invention may be stored on such a portable medium and input to the computer system 1100 via the portable storage device 1140.

Input devices 1160 provide a portion of a user interface. Input devices 1160 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 1100 as shown in FIG. 11 includes output devices 1150. Examples of suitable output devices include speakers, printers, network interfaces, and monitors.

Display system 1170 may include a liquid crystal display (LCD) or other suitable display device. Display system 1170 receives textual and graphical information and processes the information for output to the display device. Display system 1170 may also receive input as a touch-screen.

Peripherals 1180 may include any type of computer support device to add additional functionality to the computer system. For example, peripheral device(s) 1180 may include a modem or a router, printer, and other device.

The system of 1100 may also include, in some implementations, antennas, radio transmitters and radio receivers 1190. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1100 of FIG. 11 are those typically found in computer systems that may be suitable for use with embodiments of the present invention and are intended to represent a broad category of such computer components that are well known in the art. Thus, the computer system 1100 of FIG. 11 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for automatically testing software code concurrently, comprising:

detecting a test event initiated by a testing program and associated with testing a first software at a testing server, the test event detected by an agent executing within the testing program at the testing server, the testing event associated with a plurality of tests for the first software;

receiving, by the agent on the testing server from the remote server, a list of tests to be performed in response to the test event, the received list of tests being a subset of the plurality of tests, the subset of tests selected based on a call graph that is updated based on code that has changed;

modifying the subset of tests based on one or more annotations associated with one or more tests in the subset of tests;

dividing the subset of tests into two or more groups; and executing each of the two or more groups of tests concurrently.

2. The method of claim 1, further comprising, after dividing the subset of tests, moving a selected test from a first group to a second group within the two or more groups, the test moved based on an overall test duration for the first group and on an overall test duration for the second group.

3. The method of claim 2, wherein the selected test is moved to adjust a total execution time for the first group and a total execution time for the second group closer to an average test execution time for the two or more groups.

4. The method of claim 1, wherein the number of groups is based on a business plan associated with a customer for which the tests are performed.

5. The method of claim 1, wherein the list of tests to be performed is modified based on an annotation for one or more tests.

6. The method of claim 1, wherein the annotation requires the test to be added in the test list.

7. The method of claim 1, wherein the annotation requires the test to be removed from the test list.

8. The method of claim 1, wherein the annotation is created by an administrator.

9. A non-transitory computer readable storage medium having embodied thereon a program, the program being executable by a processor to perform a method for automatically testing software code concurrently, the method comprising:

detecting a test event initiated by a testing program and associated with testing a first software at a testing server, the test event detected by an agent executing within the testing program at the testing server, the testing event associated with a plurality of tests for the first software;

receiving, by the agent on the testing server from the remote server, a list of tests to be performed in response to the test event, the received list of tests being a subset of the plurality of tests, the subset of tests selected based on a call graph that is updated based on code that has changed;

modifying the subset of tests based on one or more annotations associated with one or more tests in the subset of tests;

dividing the subset of tests into two or more groups; and executing each of the two or more groups of tests concurrently.

10. The non-transitory computer readable storage medium of claim 9, the method further comprising, after dividing the subset of tests, moving a selected test from a first group to a second group within the two or more groups, the test moved based on an overall test duration for the first group and on an overall test duration for the second group.

11. The non-transitory computer readable storage medium of claim 10, wherein the selected test is moved to adjust a total execution time for the first group and a total execution time for the second group closer to an average test execution time for the two or more groups.

12. The non-transitory computer readable storage medium of claim 9, wherein the number of groups is based on a business plan associated with a customer for which the tests are performed.

13. The non-transitory computer readable storage medium of claim 9, wherein the list of tests to be performed is modified based on an annotation for one or more tests.

14. The non-transitory computer readable storage medium of claim 9, wherein the annotation requires the test to be added in the test list.

15. The non-transitory computer readable storage medium of claim 9, wherein the annotation requires the test to be removed from the test list.

16. The non-transitory computer readable storage medium of claim 9, wherein the annotation is created by an administrator.

17. A system for automatically testing software code concurrently, comprising:

a server including a memory and a processor; and one or more modules stored in the memory and executed by the processor to detect a test event initiated by a testing program and associated with testing a first software at a testing server, the test event detected by an agent executing within the testing program at the testing server, the testing event associated with a plurality of tests for the first software, receive, by the agent on the testing server from the remote server, a list of tests to be performed in response to the test event, the received list of tests being a subset of the plurality of tests, the subset of tests selected based on a call graph that is updated based on code that has changed, modify the subset of tests based on one or more annotations associated with one or more tests in the subset of tests, divide the subset of tests into two or more groups, and execute each of the two or more groups of tests concurrently.

18. The system of claim 17, the one or more modules executable to, after dividing the subset of tests, move a selected test from a first group to a second group within the two or more groups, the test moved based on an overall test duration for the first group and on an overall test duration for the second group.

19. The system of claim 18, wherein the selected test is moved to adjust a total execution time for the first group and a total execution time for the second group closer to an average test execution time for the two or more groups.

20. The system of claim 17, wherein the list of tests to be performed is modified based on an annotation for one or more tests.

* * * * *